United States Patent [19]

Huddas

[11] Patent Number: 5,243,816
[45] Date of Patent: Sep. 14, 1993

[54] SELF PURGING FUEL INJECTOR

[75] Inventor: Richard V. Huddas, Grand Haven, Mich.

[73] Assignee: Fuel Systems Textron, Inc., Zeeland, Mich.

[21] Appl. No.: 901,424

[22] Filed: Jun. 19, 1992

[51] Int. Cl.⁵ .............................................. F02G 7/00
[52] U.S. Cl. .................................. 60/39.094; 60/734; 60/740
[58] Field of Search ...................... 60/39.094, 734, 737, 60/740, 742, 748

[56] References Cited

U.S. PATENT DOCUMENTS

| | | | |
|---|---|---|---|
| 2,480,019 | 8/1949 | Grimmeisen . | |
| 2,712,218 | 7/1955 | Ritter | 60/39.094 |
| 2,846,845 | 8/1958 | Parker | 60/39.094 |
| 2,949,736 | 8/1960 | Rubbra . | |
| 2,970,772 | 2/1961 | Boosinger . | |
| 3,016,705 | 1/1962 | Kneidl et al. | 60/39.094 |
| 3,213,918 | 10/1965 | Rudzi et al. . | |
| 3,344,602 | 10/1967 | Davies et al. | 60/39.094 |
| 3,514,788 | 11/1970 | Schutz | 60/39.094 |
| 3,684,186 | 8/1972 | Helmrich . | |
| 4,041,695 | 8/1977 | Harper et al. | 60/39.094 |
| 4,066,386 | 1/1978 | Johnson | 60/39.094 |
| 4,423,595 | 1/1984 | McLean . | |
| 4,464,901 | 8/1984 | Kobayashi et al. | 60/748 |
| 4,964,270 | 10/1990 | Taylor . | |
| 4,984,424 | 1/1991 | Shekleton | 60/39.094 |

OTHER PUBLICATIONS

Drawings A and B of gas turbine engines made by Pratt & Whitney Aircraft, United Technologies Corp.

Primary Examiner—Richard A. Bertsch
Assistant Examiner—Timothy S. Thorpe
Attorney, Agent, or Firm—Flynn, Thiel, Boutell & Tanis

[57] ABSTRACT

A fuel injector for a combustor of a gas turbine engine comprises an injector housing having a fuel discharge passage for receiving pressurized fuel and communicated to the combustor for discharging the fuel thereto and an air discharge passage for receiving pressurized air and communicated to the combustor for discharging the air thereto to atomize the discharged fuel. A purge passage in the housing is communicated to the fuel discharge passage at one end and communicated to the air discharge passage at another end. The end of the purge passage is communicated to the air discharge passage by opening directly to the air discharge passage or, alternately, indirectly vis a duct member on the injector housing extending from a region proximate the end of the purge passage to the air passage. A valve in the housing is operable during fuel flow to the fuel injector for blocking communication between the purge passage and the fuel discharge passage while the purge passage and air discharge passage are communicated and, operable upon interruption of fuel flow to communicate the purge passage and fuel discharge passage to provide purge air from the air discharge passage through the purge passage to purge fuel residing in the fuel passage to the combustor.

20 Claims, 4 Drawing Sheets

SELF PURGING FUEL INJECTOR

FIELD OF THE INVENTION

The present invention relates to a self-purging fuel injector for a combustor of a gas turbine engine.

BACKGROUND OF THE INVENTION

Efforts to reduce emissions and improve combustor performance in gas turbine engines have brought about the use of staged fuel systems wherein one or more fuel injectors are used for low speed (low power) engine operation and one or more other fuel injectors are used for higher speed (higher power) engine operation. The fuel injectors used for low speed engine operation are commonly referred to as pilot or primary fuel injectors for providing a continuous fuel flow to the engine combustor for all regimes of engine operation from idle to high speed operation. The fuel injectors used for higher speed engine operation are referred to as secondary or main injectors for providing supplemental fuel flow to the engine combustor in an on-demand manner when higher engine speed (power) is required. The secondary fuel injectors thus are rendered non-operative during idle operation of the engine when the supplemental fuel flow is not needed and are rendered operative during higher speed (power) engine operation when supplemental fuel flow is required.

Airblast fuel injectors have been used in non-staged gas turbine engine fuel systems and are described in the Helmrich U.S. Pat. No. 3,684,186 issued Aug. 16, 1972 and the Simmons U.S. Pat. No. 3,980,233 issued Sep. 14, 1976. Airblast fuel injectors are designed to achieve atomization of a film of liquid fuel formed on a fuel discharge orifice surface or lip by directing high velocity airflow supplied from the engine compressor to an air passage of the injector at the fuel film as it leaves the fuel discharge orifice surface.

Airblast fuel injectors have been proposed for use in a staged gas turbine engine fuel system. However, use of airblast fuel injectors in a staged fuel system may present a so-called coking problem when the airblast fuel injectors comprise the secondary (or main) injectors of the system that are rendered non-operative during some engine operational regimes (e.g., low power regime such as low speed idle operation) and operative during other engine operational regimes (e.g., high speed operation). In particular, when the secondary (or main) fuel injectors are rendered non-operative during low power engine operation, fuel remains in the fuel discharge passages of the injectors and can be heated by the elevated temperature of the combustor environment to the extent that the fuel in the fuel discharge passages is carbonized (coked) over time, building up carbonaceous deposits therein. These deposits can adversely affect the performance of the airblast fuel injector in service from the standpoint that injector fuel flow rate and fuel atomization become unsatisfactory. Similar deposits may build-up in the fuel passages of other air atomizing fuel injectors that employ high velocity compressor airflow to atomize fuel discharged form a fuel discharge passage/lip.

SUMMARY OF THE INVENTION

The present invention contemplates a fuel injector for a combustor of a gas turbine engine wherein the fuel injector comprises an injector housing having a fuel discharge passage communicated to the combustor for discharging the fuel thereto and an air discharge passage communicated to the combustor for discharging air thereto to atomize the fuel. A purge passage in the housing is disposed between to the fuel discharge passage and the air discharge passage so as to communicate therewith. The purge passage can be communicated to the air discharge passage by opening directly to the air discharge passage. Alternately, the purge passage can be communicated to the air discharge passage by a suitable duct member on the injector housing. A valve in the housing is operable during fuel flow to the fuel injector to prevent communication between the purge passage and the fuel discharge passage. The valve is operable upon interruption of fuel flow to the fuel injector to communicate the purge passage and fuel discharge passage, and thus to communicate the air discharge passage to the fuel discharge passage, to provide purge air from the air discharge passage through the purge passage to purge fuel residing in the fuel passage to the combustor. The purge passage is operable to convey any fuel leaking past the valve during fuel flow to the fuel injector to the air discharge passage for discharge to the combustor for combustion therein.

In one embodiment of the invention, a fuel flow restrictor is disposed in the purge passage for limiting the quantity of fuel allowed to leak through the purge passage during fuel flow to the fuel injector.

In another embodiment of the invention, the air discharge passage is disposed inwardly of an annular fuel passage and an optional outer air discharge passage is disposed outwardly of the fuel discharge passage thereabout.

In a particular embodiment of the invention, the fuel injector comprises an injector housing including an elongated strut portion having a fuel inlet for receiving pressurized fuel from a source and a fuel supply passage communicated to the fuel inlet. The injector housing includes an injector portion on the strut portion for discharging fuel and air to the combustor. The injector portion comprises an outer annular fuel discharge passage communicated to the fuel supply passage and to the combustor for discharging the fuel thereto and an inner air discharge passage for receiving pressurized air and communicated to the combustor for discharging the air thereto inwardly of the discharge fuel to atomize the fuel. The injector housing includes a purge passage communicated at one end to the fuel supply passage and communicated at the other end to the inner air discharge passage, and a valve interposed between the purge passage and fuel supply passage and operable during fuel flow to the fuel injector for blocking communication between the purge passage and the fuel supply passage while the purge passage and the air discharge passage remain communicated. The valve is operable upon interruption of fuel flow to the fuel injector to communicate the purge passage and the fuel supply passage, and thus to communicate the air discharge passage to the fuel discharge passage, to purge fuel residing in the fuel supply passage and fuel discharge passage to the combustor. The purge passage is operable to convey any fuel leaking past the valve during fuel flow to the fuel injector to the air discharge passage for discharge to the combustor for combustion therein.

The present invention may be better understood when considered in light of the following detailed description of certain specific embodiments thereof taken in conjunction with the following drawings.

DETAILED DESCRIPTION OF THE INVENTION

Figure 1:
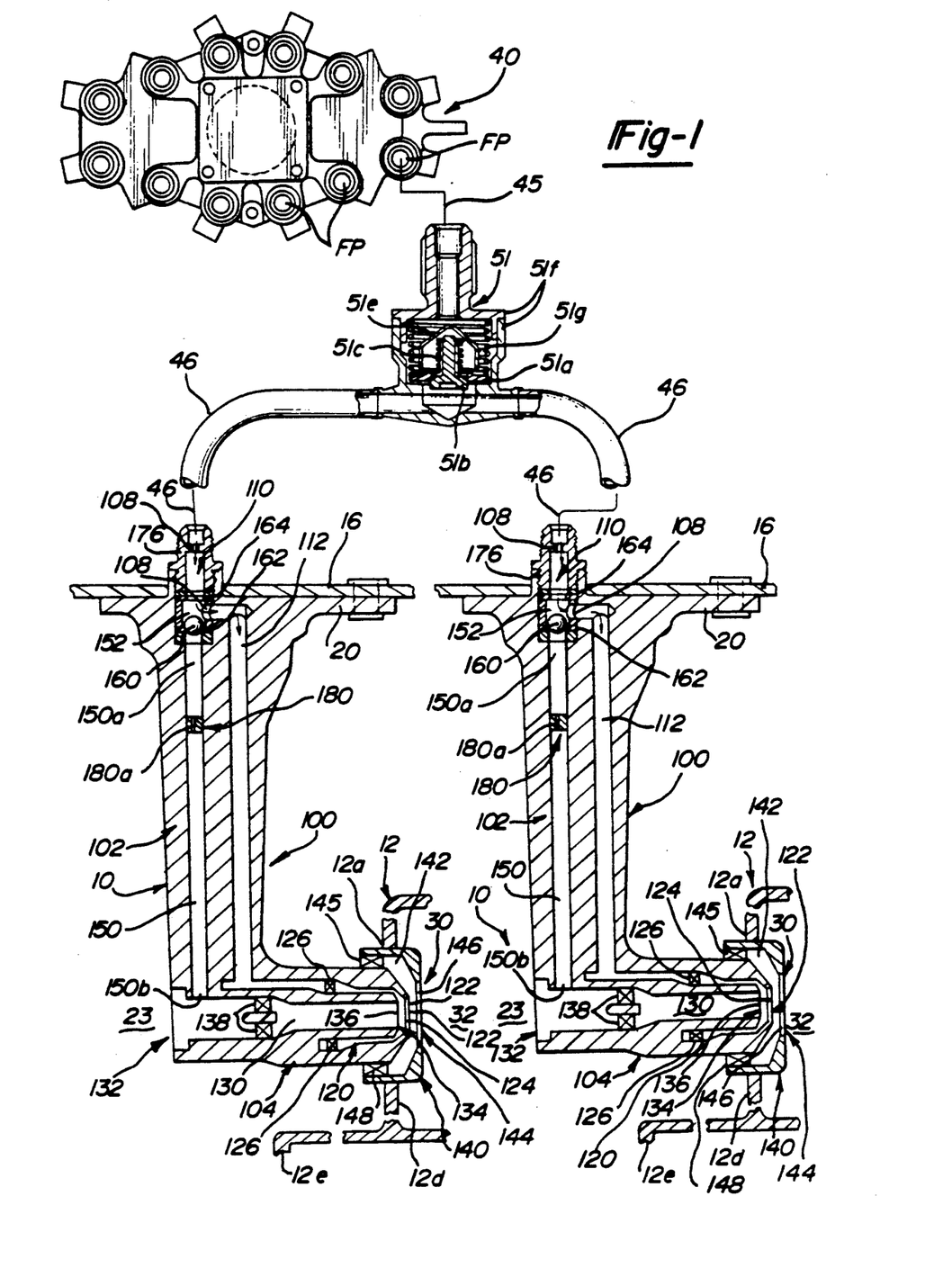
FIG. 1 is a side sectioned view of a fuel injector in accordance with one embodiment of the invention operably disposed to a combustor of a gas turbine engine for supplying secondary fuel in a staged manner to an annular engine combustor, which is partially shown.
Figure 2:
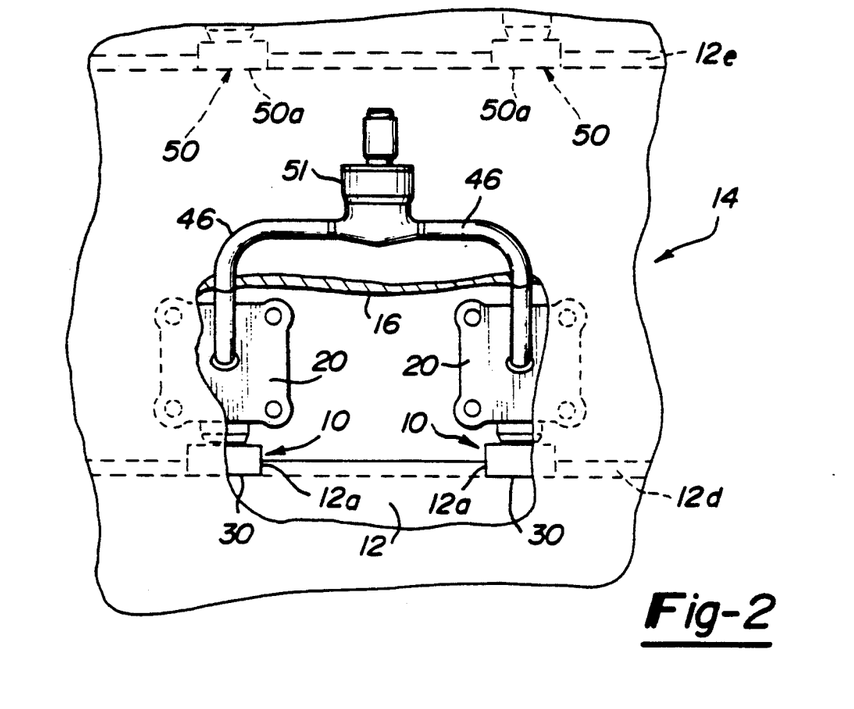
FIG. 2 is a partial top view of the embodiment of FIG. 1 with the outer engine duct broken away to reveal the fuel injectors and the combustor.

Referring to FIG. 1, fuel injectors 10 in accordance with one embodiment of the invention are illustrated operatively associated relative to an annular combustor 12 of a gas turbine engine 14. The combustor 12 is disposed inside an engine duct 16 for receiving pressurized (superambient pressure) discharge air from air supply means, such as the engine compressor (not shown) located upstream of the combustor 12 in conventional manner. FIG. 2 illustrates a plurality (two shown) of the fuel injectors 10 for use as secondary (or main) injectors for staging fuel supply to the combustor 12 as called for during high power (e.g., high speed) regimes of engine operation. The fuel injectors 10 each include a flange 20 fastened (e.g., bolted) to the duct 16 and having fuel/air discharge tips 30 received in openings 12a of the combustor wall 12d so as to communicate with the combustion chamber 32 defined therein. Although only the single pair of fuel injectors 10 is shown in FIG. 2, it is to be understood that other like fuel injectors 10 are mounted by like flanges 20 on the duct 16 in the same common axial plane and circumferentially spaced apart about the annular combustor 12 so that their fuel/air discharge tips 30 are received in corresponding circumferentially spaced openings 12a in the combustor 12.

As mentioned hereinabove, the fuel injectors 10 are shown for use as secondary (or main) injectors for staging fuel supply to the combustor 12 as called for during high power (e.g., high speed) regimes of engine operation. To this end, a fuel distribution valve 40 (fuel supply valve) is shown having a fuel supply port FP connected by a fuel conduit 45 (shown schematically) to each fuel injector 10 to control fuel flow thereto. Other fuel supply ports FP of the fuel distribution valve 40 are likewise connected to respective fuel injectors 10 disposed about the combustor 12 as described above. The fuel distribution valve 40 is connected to a source (not shown) of pressurized fuel and meters fuel to each fuel injector 10 via conduit 45 and a fuel shut-off valve 51 disposed between the conduit 45 and a downstream fuel conduit 46. The fuel shut-off valve 51 preferably comprises an on/off check valve having a valve seat 51a and valve 51b that is biased by spring 51c to close when fuel pressure in the conduit 45 upstream of the valve is less than a selected value; e.g., when a 40 psi (or other selected pressure such as 50, 60, etc. psi) differential is present across the valve. The valve 51b is closed and seals against the seat 51a when the fuel pressure upstream of the valve drops below the selected value. The valve 51b may have a "soft" seat formed by a resilient (plastic) insert or a "hard" seat of suitably hard material, such as heat treatable stainless steel, to cooperate with valve seat 51a to effect sealing. A fuel filter element 51e is provided to remove dirt, debris, etc. from the fuel flowing through the valve 51. Spring 51g holds the valve seat 51a and filter element 51e in position relative to the housing 51f. The ends of fuel conduits 45, 46 are connected to the valve housing 51f by welding, brazing or other fastening techniques. The fuel shut-off valve 51 may be omitted in practicing the invention.

The fuel distribution valve 40 may be a distribution valve of the type used on the V2500 gas turbine engine sold by the Pratt & Whitney Aircraft Division of United Technologies Corporation. The distribution valve is made by the Hamilton Standard Division of United Technologies Corporation. The fuel distribution valve 40 may also comprise a distribution valve of the type described in U.S. Pat. No. 4,614,202 and 4,590,768, the teachings of which are incorporated herein by reference.

The fuel injectors 10 are shown for use in conjunction with pilot fuel injectors 50 (only two shown in FIG. 2). Although only two pilot fuel injectors are shown, it should be understood that other like pilot injectors are circumferentially spaced apart about the combustor 12 in a common axial plane upstream of the secondary fuel injectors 10. The pilot fuel injectors 50 may be mounted on the duct 16 in a similar manner described above for mounting the fuel injectors 10 so that the discharge tips 50a of the pilot injectors are received in circumferentially spaced openings in an upstream combustor wall 12e. The pilot fuel injectors 50 are appropriately disposed, such as at a different elevation or level, on the combustor 12 so that they receive pressurized discharge air from an air supply plenum communicated to the engine compressor (not shown). The pilot fuel injectors 50 may comprise airblast fuel injectors similar to the fuel injectors 10 or of the type described in Helmrich U.S. Pat. No. 3,864,186. The pilot fuel injectors 50 provide atomized primary fuel flow to the combustor 12 during all regimes of engine operation as is known. The pilot fuel injectors 50 are typically supplied with fuel via a fuel distribution valve like valve 40 described hereinabove via suitable fuel conduits.

The secondary fuel injectors 10 are shown as comprising air atomizing (airblast) fuel injectors wherein pressurized discharge air (see arrows) is received from air supply plenum 23 constituting air supply means and communicating with the engine compressor (not shown) and discharged from the fuel injectors to atomize the fuel also discharging therefrom into the combustor 12 so as to support combustion of the discharged fuel as a supplemental flame region in the combustor 12.

The fuel injectors 10 are of identical construction. Each fuel injector 10 comprises an injector housing 100 including an elongated strut portion 102 having the aforementioned flange 20 by which the fuel injector is fastened to the engine duct 16 and an injector portion 104 to be described hereinbelow. The strut portion 102 includes a fuel inlet 110 for receiving pressurized fuel from the distribution valve 40 via conduits 45, 46 and open valve 51 and also includes a strut fuel supply passage 112 communicated to the fuel inlet 110 for receiving pressurized fuel therefrom. The fuel inlet 110 includes a trim orifice 108 therein that provides for adjustment of fuel flow to each fuel injector 10 in a manner to provide generally the same fuel flow rate to all of the fuel injectors 10.

The injector portion 104 of the housing 100 includes an annular fuel discharge passage 120 communicated to the fuel supply passage 112 and to the combustor 12 (i.e., combustion chamber 32) for discharging the fuel thereto. In particular, the fuel discharge passage 120 terminates in a downstream fuel discharge orifice 122 defined by an annular fuel discharge lip 124. A plurality of circumferentially spaced apart fuel swirl vanes or passages 126 are disposed in the passage 120 for imparting a swirling action to the fuel flowing therethrough.

The injector portion 104 also includes a central, inner air discharge passage 130 having an open, upstream end 132 communicated to the air supply plenum 23 for receiving pressurized air therefrom. The air discharge passage 130 includes a downstream air discharge orifice 134 defined by annular discharge lip 136 and communicated to the combustor 12 (combustion chamber 32) for discharging air thereto inwardly of the discharged fuel to atomize the fuel. A plurality of air swirl vanes 138 are disposed in the air discharge passage 130 to impart a swirling action to the air flowing therethrough. The inner air discharge passage 130 may be formed by a separate tubular sleeve fastened on the injector housing 100 rather than integrally formed therewith; e.g., as shown in the aforementioned Helmrich U.S. Pat. No. 3,864,186.

The injector portion 104 may optionally include an outer air shroud 140 mounted thereon for receiving compressor discharge air from the plenum 23 for discharge to the combustor 12 (combustion chamber 32) outwardly of the discharged fuel. The outer air shroud 140 may be fastened on the combustor wall 12d in lieu of on the injector portion 104 of each fuel injector 10.

The outer air shroud 140 includes an outer, annular air discharge passage 142 having an open, upstream end 145 communicated to the plenum 23 for receiving pressurized air therefrom and having a downstream air discharge orifice 144 defined by annular discharge lip 146 and communicated to the combustor 12 (combustion chamber 32) for discharging air thereto outwardly of the discharged fuel. A plurality of circumferentially spaced apart air swirl vanes 148 are disposed in the outer air discharge passage 142 to impart a swirling action to the air flowing therethrough. The fuel discharging from lip 124 is thereby atomized by inner and outer air discharged from respective lips 136, 146. Such atomizing action is described in the aforementioned Helmrich U.S. Pat. No. 3,684,186.

The injector housing 100 includes a purge passage 150 formed in the strut portion 102 and extending generally parallel with the fuel supply passage 112, although the invention is not limited to any particular orientation of the purge passage and fuel supply passage. The purge passage 150 is disposed between the air discharge passage 130 and the fuel supply passage 112. In particular, the purge passage 150 is communicated to the fuel supply passage 112 at one end 150a via a common chamber 152 in the fuel inlet 110 and is communicated to the inner air discharge passage 130 at another end 150b. The end 150b of the purge passage 150 communicates directly with the inner air discharge passage 130 by opening or radially intersecting directly therewith. This communication allows any fuel leakage past a valve 160 through the purge passage 150 during fuel flow to the fuel injector 10 to be conveyed to the inner air discharge passage 130 for discharge to the combustor 12 for combustion therein as will be explained hereinbelow.

Figure 3:
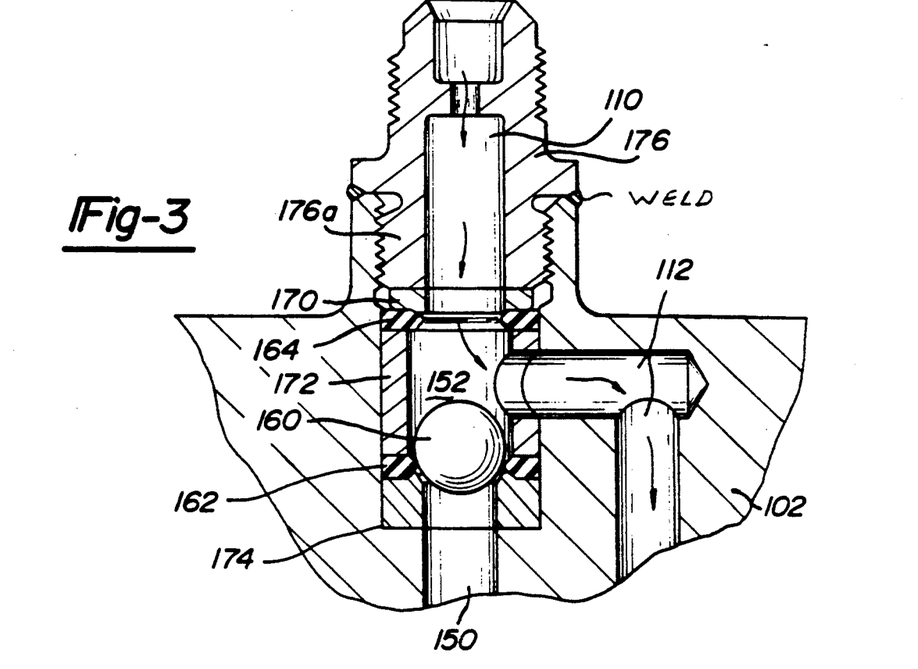
FIG. 3 is an enlarged partial sectional view of the ball valve of the fuel injector showing the valve in the first operable position during fuel flow to the fuel injector to block communication between the purge passage and the fuel supply passage.

A valve 160 is disposed in the injector housing 100 at the junction of the fuel supply passage 112 and the purge passage 150; i.e., in the common chamber 152 communicated to the fuel inlet 110. In effect, the valve 160 is interposed between the purge passage and the fuel supply passage. The valve 160 is shown in FIGS. 1 and 3 as a ball valve operable during fuel flow to the fuel injector 10 to prevent (i.e., block) communication between the purge passage 150 and the fuel supply passage 112 while the purge passage 150 remains communicated at all times to the air discharge passage 130 and to permit pressurized fuel flow to the fuel supply passage 112 from the fuel inlet 110 to the fuel discharge passage 120. In particular, the ball valve 160 is retained against the valve seat 162 (first operable position) by the pressure of the pressurized fuel in the fuel inlet 110.

The ball valve 160 is operable upon interruption (by valve 51) of fuel flow to the fuel injector 10 to communicate the purge passage 150 and the fuel supply passage 112, and thus to communicate the air discharge passage 130 to the fuel supply passage 112 so as to admit pressurized air from the plenum 23 to the fuel supply passage 112 and the fuel discharge passage 120 to purge fuel residing therein through the orifice 122 to the combustor 12 while also preventing further fuel flow to the chamber 152 from the fuel inlet 110. In particular, the ball valve 160 is retained against the valve seat 164, FIG. 4, by the pressure of the pressurized air in the air discharge passage 130 and plenum 23 when the valve 51 shuts off fuel flow to the fuel injector 10. The ball valve 160 is typically made of material, such as metal (e.g., Type 346 stainless), that allows the fuel pressure to close it against the seat 162 during fuel flow to the fuel injector 10 and to allow the air pressure in the air discharge passage 130 to open it against seat 164 when fuel flow is interrupted to the fuel injector 10.

Figure 4:
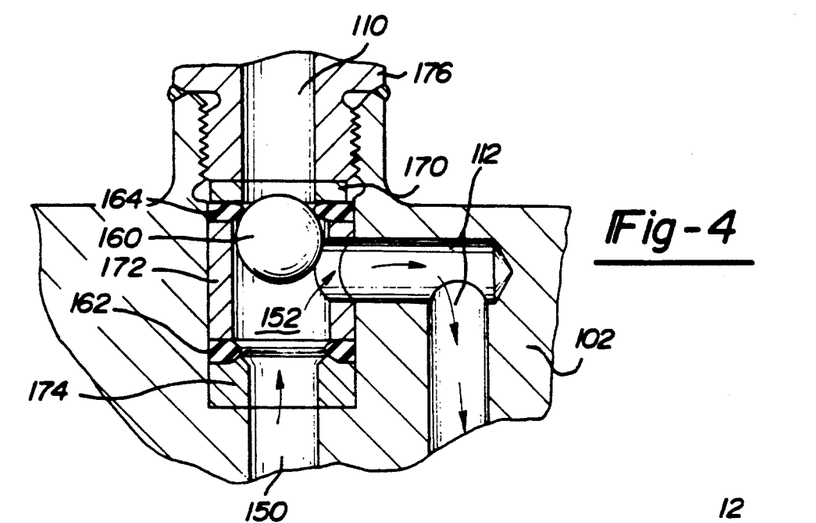
FIG. 4 is an enlarged partial sectional view similar to FIG. 3 showing the ball valve in the second operable position upon interruption in fuel flow to the fuel injector to communicate the purge passage and the fuel supply passage to admit purge air from the air discharge passage to the fuel supply passage and the fuel discharge passage.

The valve seats 162, 164 are held in position in the chamber 152 by positioning rings 170, 172, 174 that, in turn, are held in the chamber 152 by the nose 176a of the fuel inlet fitting 176 threaded into the housing 100 as shown and defining the fuel inlet 110 therein. The valve seats 162, 164 typically comprise an elastomeric material, such as KALREZ perfluoroelastomer material available from DuPont Co., Wilmington, Del., although other seat materials may be used in practicing the invention. As is apparent, the fuel supply passage 112 communicates to the chamber 152 defined between the valve seats 162, 164 so that either fuel or purge air can be directed therethrough depending on whether or not fuel is supplied to the fuel injector 10 by valve 51.

The purge passage 150 is operable to convey any fuel leaking past the valve 160 (when closed against valve seat 162 when fuel is supplied to the fuel injector 10) to the inner air discharge passage 130 for discharge to the combustor 12 for combustion therein. The purge passage 150 includes an annular flow restrictor 180 having a flow aperture 180a sized to limit the quantity of fuel leakage through the purge passage 150 during such fuel flow operation of the fuel injector 10.

When the supply of fuel to the fuel injector 10 is interrupted (e.g., by valve 51) during the lower power regime of engine operation (during engine idle operation), pressurized air in the inner air discharge passage 112 opens the valve 160 and allows the pressurized air to flow through the purge passage 150, fuel supply passage 112 and the fuel discharge passage 120 to purge the resident fuel (i.e., fuel residing in the passages 112, 120).

The purging of fuel from the passages 112, 120 occurs rapidly enough after fuel flow is shut off by the shut-off valve 51 (in response to reduced fuel flow by the distribution valve 40) to cause the purged fuel to be ignited and combusted by the combustion flame region sustained by the fuel/air previously discharged from the injectors 10 prior to the valve 51 being closed.

As a result, the gas turbine engine can be operated in a staged manner wherein the fuel injectors 10 are supplied fuel by the distribution valve 40 and open shut-off valve 51 as required during a high power regime of engine operation to render the fuel injectors 10 operative to sustain a supplemental combustion flame region in the combustor 12 for increased power. When the engine is to be operated at a lower power regime (e.g., idle or high altitude descent), the distribution fuel valve 40 will be actuated to reduce fuel flow to the fuel injectors 10 to an extent that causes the shut-off valve 51 to close and render the injectors 10 subsequently non-operative to supply supplemental fuel to the combustor 12. When the fuel injectors 10 are rendered non-operative to provide staged fuel flow, the ball valve 160 is opened against seat 164 by the air pressure in the air discharge passage 130 to provide purge air through the purge passage 150 to purge the fuel residing in the passages 112, 120 through orifice 122 (past lip 124) into the combustor 12 rapidly enough to ignite the purged fuel by the preexisting flame region of the injectors 10 for combustion in the combustor. Emissions from the engine otherwise attributable to dumping of raw fuel into the combustor when the injectors 10 are rendered non-operative are substantially reduced. Moreover, coking of fuel that would otherwise reside in the fuel discharge passages 120 is substantially avoided.

Figure 5:
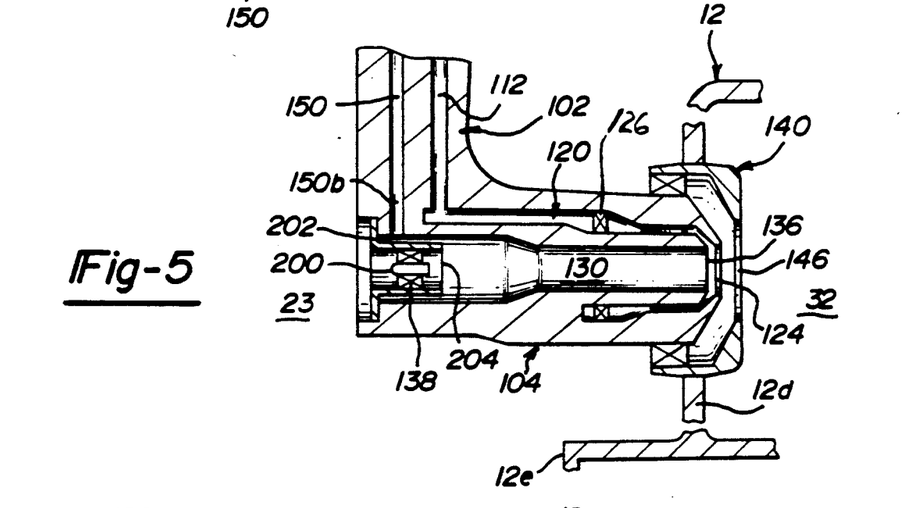
FIG. 5 is a partial sectional view of a fuel injector in accordance with another embodiment of the invention wherein the purge passage is communicated to the inner air discharge passage by a duct member in the air discharge passage.
Figure 6:
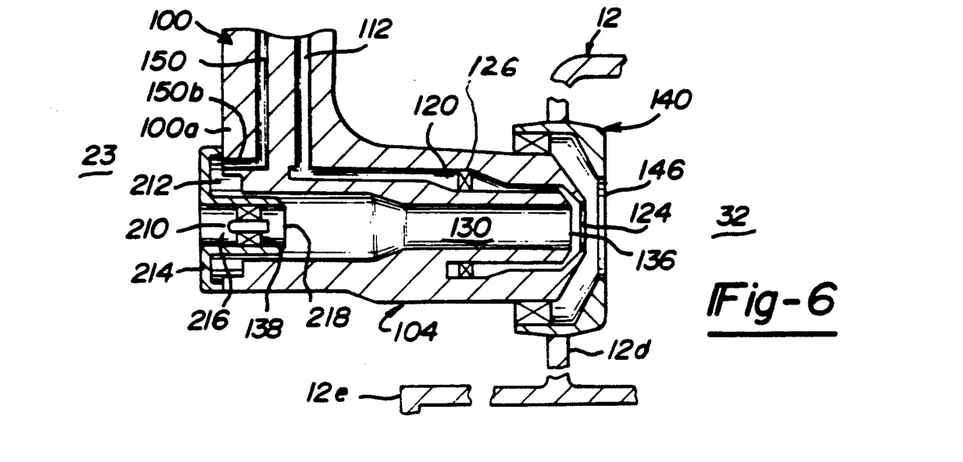
FIG. 6 is a partial sectional view of a fuel injector in accordance with still another embodiment of the invention wherein the purge passage is communicated to the inner air discharge passage by a duct member on the injector housing extending from an upstream end of the housing to the air discharge passage.

The invention has been described hereinabove with respect to the end 150b of the purge passage 150 communicating directly with the inner air discharge passage 130. The invention envisions the end 150b of the purge passage 150 communicating with the inner air discharge passage 130 via a duct member 200 or 210 as illustrated in FIGS. 5 and 6 wherein like features of FIGS. 1-4 are designated by like reference numerals. For example, in FIG. 5, the end 150b of the purge passage 150 communicates to an annular space 202 defined by the tubular duct member 180 spaced in the upstream end of the air discharge passage 130 and extending axially to a downstream discharge lip 204 that communicates to the air discharge passage 130. Thus, any fuel leaking past the valve 160 is discharged to the space 202 and then from lip 204 into the air discharge passage 130. The fuel is then discharged into the combustor 12 for combustion. The tubular duct member 200 can be fastened (e.g., by brazing) to the injector housing 100 in the upstream end of the air discharge passage 130.

In FIG. 6, the end 150b of the purge passage 150 opens through an upstream end 100a of the injector housing 100 and communicates to a space 212 defined between the tubular duct member 210 and the upstream 100a end. The duct member 210 includes an upstream peripheral end 214 that defines the space 212 to which the end 150b communicates and an axially extending sleeve 216 spaced in the air discharge passage 130 and terminating in a downstream discharge lip 218 communicating to the air discharge passage 130. Thus, any fuel leaking past the valve 160 is discharged to the space 212 at the upstream housing end 100a and then from lip 218 into the air discharge passage 130. The fuel is then discharged into the combustor 12 for combustion. The tubular duct member 210 can be fastened (e.g., by brazing) to the injector housing 100.

The arrangements of FIGS. 5-6 as well as FIG. 1-4 are effective to provide means for conveying any fuel leaking past the valve 160 when fuel is supplied to the fuel injector 10 (i.e., when the fuel injectors 10 are supplying secondary fuel to the combustor 12 during high power operation of the engine) to the inner air discharge passage 130 for discharge to the combustor for combustion therein. Thus, any fuel leaking past the valve 160 will not find its way into the air supply plenum 23 upstream of the combustor 12 where, if ignited, serious damage could be done to the proximate engine components.

Figure 7:
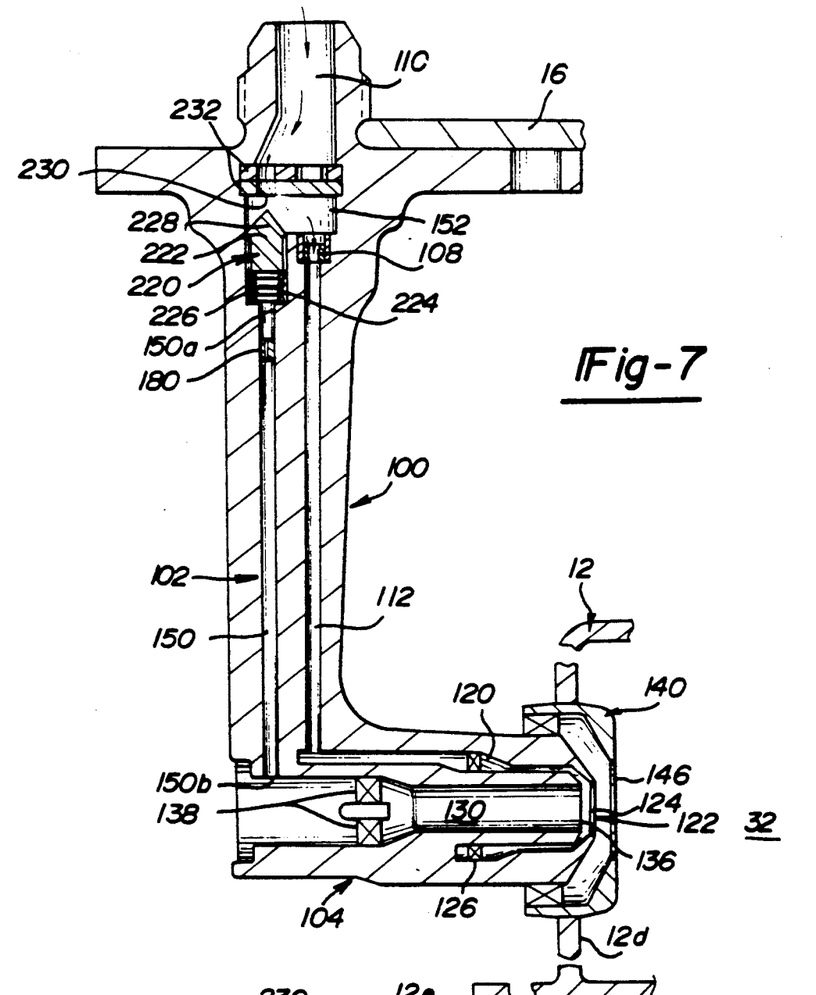
FIG. 7 is a longitudinal sectional view of a fuel injector in accordance with another embodiment of the invention with a spring biased valve in the first operable position during fuel flow to the fuel injector.
Figure 8:
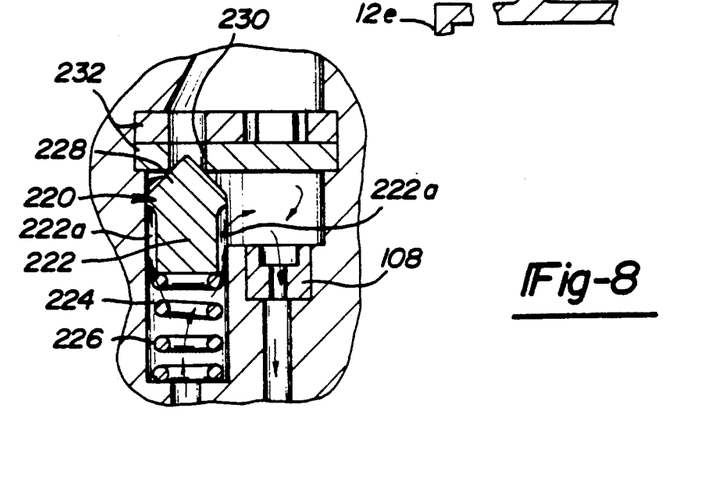
FIG. 8 is a partial enlarged sectional view of the valve of FIG. 7 in the second operable position upon interruption of fuel flow to the fuel injector to admit purge air to the outer fuel discharge passage.

FIGS. 7-8 illustrate another embodiment of the invention wherein like features are represented by like reference numerals. This embodiment differs from those described hereinabove in using a spring biased valve 220 in the chamber 152 that interconnects the fuel supply passage 112 and the purge passage 150. The valve 220 includes a cylindrical body 222 received in a counterbore 224 in the housing 100 and rests atop a coil spring 226 therein. The valve 220 includes a frusto-conical end 228 that cooperates with a valve seat 230 on members 232 positioned cross-wise of the chamber 152 as shown. When pressurized fuel is supplied to the fuel inlet 110, the fuel pressure forces the valve 220 downwardly in FIG. 7 against bias of the spring 226 to a first operable position relative to the seat 230 to block communication between the purge passage 150 and fuel discharge passage 120 while the purge passage remains communicated to the air discharge passage 130 and to allow fuel flow to the fuel supply passage 112 via the trim orifice 108 for discharge from the fuel discharge passage 120 (i.e., through discharge orifice 122 defined by lip 124) to the combustor. On the other hand, when pressurized fuel flow is interrupted to the fuel inlet 110 (by valve 51), the spring 226 assists the air pressure in the inner air discharge passage 130 in moving the valve 110 upwardly until the valve end 228 seats against seat 230 (second operable position) to prevent further fuel flow to the fuel supply passage 112 from the fuel inlet 110 and to communicate the purge passage 150 and fuel supply passage 112 such that purge air is directed through the purge passage 150, fuel supply passage 112, and fuel discharge passage 120 to purge the fuel residing therein through the orifice 122 to the combustor 12 for combustion therein. The valve body 222 includes circumferentially spaced apart slots 222a to provide a path for the purging air flow. Emissions from the engine otherwise attributable to dumping of raw fuel into the combustor when the injectors 10 are thereby rendered non-operative are substantially reduced. Moreover, coking of fuel that would otherwise reside in the fuel discharge passages 120 is substantially avoided.

Any fuel leaking past the valve 220 during fuel flow operation of the fuel injector 10 (i.e., when the fuel injectors 10 are supplying secondary fuel to the combustor 12 during high power operation of the engine) is discharged to the inner air discharge passage 130 for discharge to the combustor for combustion therein. Thus, any fuel leaking past the valve 220 will not find its way into the air supply plenum 23 upstream of the combustor 12 where, if ignited, serious damage could be done to the proximate engine components.

The present invention has been described hereinabove with respect to the fuel injectors 10 comprising secondary (or main) fuel injectors of a staged fuel injector system of a gas turbine engine to supply fuel to the combustor during the high power (e.g., high speed) regime of engine operation while pilot fuel injectors 50 provide fuel for both the lower power regime (e.g., lower idle speed) and high power engine operation. However, the invention is not so limited. For example, the pilot fuel injectors 50 referred to above may be similar to the fuel injectors 10 so that resident fuel is purged from the pilot fuel injectors to the combustor 12 by the purge air in the manner described hereinabove in the event of an unintentional interruption in supply of the pilot fuel thereto during operation of the engine.

In general, the fuel injectors 10 may be used in other instances in a fuel injector system where there is a need to purge fuel from the fuel discharge means in the event of an intentional or unintentional interruption in the supply of fuel to the injectors.

While certain specific embodiments of the invention have been described in detail hereinabove, it is not intended to be limited thereto but rather only to the extent set forth hereafter in the claims which follow.

I claim:

1. A fuel injector for a combustor of a gas turbine engine, comprising an injector housing having a fuel discharge passage communicated to the combustor for discharging fuel thereto, an air discharge passage in the housing separate from the fuel discharge passage and communicated to the combustor for discharging pressurized air thereto, a purge passage in the housing between said fuel discharge passage and said air discharge passage and in communication with said air discharge passage, and a valve in the housing operable during fuel flow to the fuel injector to prevent communication between the purge passage and the fuel discharge passage without interrupting discharge of pressurized air from said air discharge passage to said combustor, and operable upon interruption of fuel flow to the fuel injector to communicate the purge passage to the fuel discharge passage so as to provide pressurized air from said air discharge passage through said purge passage to purge fuel residing in the fuel discharge passage to the combustor, said purge passage being in communication with said air discharge passage so as to discharge any fuel leaking past the valve during fuel flow to the fuel injector to said air discharge passage in said housing for discharge to the combustor for combustion therein.

2. The injector of claim 1 wherein said purge passage is communicated to the air discharge passage by opening directly to the air discharge passage.

3. The injector of claim 1 wherein said purge passage is communicated to the air discharge passage by a duct member on the injector housing extending to the air discharge passage.

4. The injector of claim 1 further comprising a fuel flow restrictor in the purge passage for limiting the quantity of fuel leaking through the purge passage.

5. The injector of claim 1 wherein the valve comprises a valve member movable to a first seat during fuel flow to the injector to prevent communication between the purge passage and the fuel discharge passage and to a second seat for communicating the purge passage and fuel discharge passage upon interruption in fuel flow to the fuel injector.

6. The fuel injector of claim 5 wherein the valve member comprises a ball valve.

7. The fuel injector of claim 5 wherein the valve member is spring biased toward the first position upon interruption of fuel flow.

8. The fuel injector of claim 1 wherein the air discharge passage is disposed within the fuel discharge passage.

9. The fuel injector of claim 8 wherein an outer air discharge passage is disposed about the fuel discharge passage and is communicated to the combustor for discharging air thereto.

10. A fuel injector for a combustor of a gas turbine engine, comprising an injector housing having a fuel inlet for receiving pressurized fuel from a source, a fuel supply passage communicated to the fuel inlet, and an annular fuel discharge passage communicated to the fuel supply passage and to the combustor by a fuel discharge orifice for discharging fuel thereto, an air discharge passage in the housing separate from the fuel discharge passage and having an upstream end for receiving pressurized air and communicated to the combustor by a downstream air discharge orifice disposed inwardly of the fuel discharge orifice for discharging the pressurized air thereto, a purge passage in the housing between said fuel supply passage and said air discharge passage and in communication with said air discharge passage, and a valve between the purge passage and the fuel supply passage and operable during fuel flow to the fuel injector for preventing communication between the purge passage and the fuel supply passage without interrupting discharge of pressurized air from said air discharge orifice to said combustor, and operable upon interruption of fuel flow to the fuel injector to communicate the purge passage and the fuel supply passage so as to provide pressurized air from said air discharge passage through said purge passage to purge fuel residing in the fuel supply passage and the fuel discharge passage to the combustor, said purge passage being in communication with said air discharge passage so as to discharge any fuel leaking past the valve during fuel flow to the fuel injector to said air discharge passage in said housing for discharge from said downstream air discharge orifice to the combustor for combustion therein.

11. The injector of claim 10 wherein said purge passage is communicated to the air discharge passage by opening directly to the air discharge passage.

12. The injector of claim 10 wherein said purge passage is communicated to the air discharge passage by a duct member on the injector housing extending to the air discharge passage.

13. The injector of claim 10 further comprising a fuel flow restrictor in the purge passage for limiting the quantity of fuel leaking through the purge passage.

14. The injector of claim 10 wherein the valve comprises a valve member movable to a first seat during fuel flow to the fuel injector to prevent communication between the purge passage and the fuel supply passage and to a second seat for communicating the purge passage and fuel supply passage upon interruption in fuel flow to the fuel injector.

15. The fuel injector of claim 10 wherein the valve member comprises a ball valve.

16. The fuel injector of claim 10 wherein an outer air discharge passage is disposed about the fuel passage and is communicated to the combustor for discharging air thereto.

17. An air atomizing fuel injector for a combustor of a gas turbine engine, comprising an injector housing having an elongated strut portion with a fuel inlet for receiving pressurized fuel from a source and a fuel supply passage communicated to the fuel inlet and having an injector portion on the strut portion for discharging fuel and air to the combustor, the injector portion comprising an annular fuel discharge passage communicated to the fuel supply passage and to the combustor for discharging fuel thereto and an air discharge passage in the injector portion separate from the fuel discharge passage and having an upstream end for receiving pressurized air from pressurized air supply plenum means and a downstream end communicated to the combustor for discharging the pressurized air thereto inwardly o the discharge fuel to atomize the fuel, said injector housing including a purge passage between said fuel supply passage and said air discharge passage and communicated to said air discharge passage, and a valve between the purge passage and the fuel supply passage and operable during fuel flow to the fuel injector for preventing communication between the purge passage and the fuel supply passage without interrupting discharge of pressurized air from said air discharge passage to said combustor, and operable upon interruption of fuel flow to the fuel injector to communicate the purge passage and fuel supply passage so as to provide pressurized air from said air discharge passage through said purge passage to purge fuel residing in the fuel supply passage and fuel discharge passage to the combustor, said purge passage being in communication with said air discharge passage so as to discharge any fuel leaking past the valve during fuel flow to the fuel injector to said air discharge passage in said housing for discharge from said downstream end to the combustor for combustion therein.

18. The injector of claim 17 wherein said purge passage is communicated to the air discharge passage by opening directly to the air discharge passage.

19. The injector of claim 17 wherein said purge passage is communicated to the air discharge passage by a duct member on the injector housing extending to the air discharge passage.

20. The injector of claim 17 further comprising a fuel flow restrictor in the purge passage for limiting the quantity of fuel leaking through the purge passage.

* * * * *

UNITED STATES PATENT AND TRADEMARK OFFICE
CERTIFICATE OF CORRECTION

PATENT NO. :   5 243 816

DATED      :   September 14, 1993

INVENTOR(S) :  Richard V. HUDDAS

It is certified that error appears in the above-identified patent and that said Letters Patent is hereby corrected as shown below:

Column 12, line 3; replace "o" with ---of---.

Signed and Sealed this

Twenty-ninth Day of March, 1994

Attest:

BRUCE LEHMAN

Attesting Officer        Commissioner of Patents and Trademarks